US011761835B2

(12) United States Patent
Endo et al.

(10) Patent No.: US 11,761,835 B2
(45) Date of Patent: Sep. 19, 2023

(54) MOUNTING STRUCTURE FOR TORQUE SENSOR (71) Applicant: NIDEC COPAL ELECTRONICS CORPORATION, Tokyo (JP)

(72) Inventors: Takayuki Endo, Sano (JP); Keiya Hoshino, Sano (JP); Yoko Yasutomi, Sano (JP); Subei Shun, Sano (JP); Yuji Usui, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 407 days.

(21) Appl. No.: 17/147,641

(22) Filed: Jan. 13, 2021

(65) Prior Publication Data
US 2021/0131892 A1 May 6, 2021

Related U.S. Application Data
(63) Continuation of application No. PCT/JP2019/018144, filed on Apr. 26, 2019.

(30) Foreign Application Priority Data
Jul. 13, 2018 (JP) .................................. 2018-133255

(51) Int. Cl.
G01L 3/00 (2006.01)
G01L 3/10 (2006.01)
(Continued)

(52) U.S. Cl.
CPC ............... *G01L 3/108* (2013.01); *B25J 19/02* (2013.01); *G01L 5/0061* (2013.01)

(58) Field of Classification Search
CPC ........... G01L 3/108; G01L 5/006; B25J 19/02
See application file for complete search history.

(56) References Cited

U.S. PATENT DOCUMENTS 4,471,663 A * 9/1984 Wallace ................... E21B 44/04
73/862.339
5,445,036 A * 8/1995 Hordnes ................ G01L 3/1457
73/862.321
(Continued)

FOREIGN PATENT DOCUMENTS

CN 101118194 2/2008
CN 102235926 11/2011
(Continued)

OTHER PUBLICATIONS

Extended European Search Report issued in corresponding EP Application 19833688.5, dated Mar. 14, 2022.
(Continued)

Primary Examiner — Max H Noori
(74) Attorney, Agent, or Firm — Burris Law, PLLC (57) ABSTRACT The object is to provide a mounting structure for a torque sensor capable of improving a detection accuracy of a torque sensor. A torque sensor includes a first structure, a second structure, a third structure provided between the first structure and the second structure, and at least two sensor units provided between the first structure and the second structure. A plurality of contact portions are provided on one of the first structure and the first attachment portion and one of the second structure and the second attachment portion, and are in contact with another of the first structure and the first attachment portion and another of the second structure and the second attachment portion.

20 Claims, 8 Drawing Sheets

(51) Int. Cl.
  *B25J 19/02* (2006.01)
  *G01L 5/00* (2006.01)

(56) References Cited

U.S. PATENT DOCUMENTS

| | | | | |
|---|---|---|---|---|
| 8,984,963 | B2* | 3/2015 | Christmann | G01L 3/10 |
| | | | | 73/862.041 |
| 11,628,698 | B2* | 4/2023 | Singh | B60D 1/249 |
| | | | | 280/504 |
| 2009/0314103 | A1* | 12/2009 | Sakers | G01L 3/1428 |
| | | | | 73/862.321 |
| 2012/0285265 | A1* | 11/2012 | Sasaki | B62J 45/411 |
| | | | | 73/862.045 |
| 2014/0260682 | A1* | 9/2014 | Christmann | G01L 3/10 |
| | | | | 409/131 |
| 2017/0177114 | A1* | 6/2017 | Frey | G06F 3/0445 |
| 2017/0211999 | A1 | 7/2017 | Bradford et al. | |
| 2017/0241761 | A1 | 8/2017 | Kosaka et al. | |
| 2018/0209860 | A1 | 7/2018 | Okada et al. | |
| 2021/0131892 | A1* | 5/2021 | Endo | G01L 5/0076 |
| 2021/0131893 | A1* | 5/2021 | Takada | B25J 19/02 |
| 2023/0112855 | A1* | 4/2023 | Olson | A61B 17/1684 |
| | | | | 606/80 |

FOREIGN PATENT DOCUMENTS

| | | |
|---|---|---|
| CN | 204831658 | 12/2015 |
| CN | 105606279 | 5/2016 |
| CN | 107121117 | 9/2017 |
| CN | 107850503 | 3/2018 |
| JP | H0432041 | 3/1992 |
| JP | H11141584 | 5/1999 |
| JP | 2007292916 | 11/2007 |
| JP | 2010169586 | 8/2010 |
| JP | 2012255522 | 12/2012 |
| JP | 2013096735 | 5/2013 |
| JP | 2015049209 | 3/2015 |
| JP | 2017032301 | 2/2017 |
| JP | 2017151072 | 8/2017 |
| JP | 2017172983 | 9/2017 |
| JP | 2018091813 | 6/2018 |
| JP | 2018096757 | 6/2018 |
| KR | 101138532 | 4/2012 |
| TW | 201534881 | 9/2015 |

OTHER PUBLICATIONS

Extended European Search Report issued in corresponding EP Application 19834709.8, dated Apr. 19, 2022.
International Search Report for International Application PCT/JP2019/027214, dated Sep. 24, 2019.
International Search Report for International Application PCT/JP2019/018144, dated May 28, 2019.
Office Action issued in corresponding CN Application No. 201980046674.6, dated Nov. 3, 2021, and an English translation thereof.
Office Action issued in corresponding TW Application No. 108124491, dated Dec. 6, 2022, and an English translation thereof, 12 pages.

* cited by examiner

MOUNTING STRUCTURE FOR TORQUE SENSOR

CROSS-REFERENCE TO RELATED APPLICATIONS

This application is a continuation of International Application No. PCT/JP2019/018144, filed on Apr. 26, 2019, which claims priority to and the benefit of Japanese Patent Application No. 2018-133255, filed on Jul. 13, 2018. The disclosures of the above applications are incorporated herein by reference.

FIELD

The present disclosure relates to a torque sensor applied to, for example, robot sensor and the like, and also relate to a mounting structure for a torque sensor.

BACKGROUND

A torque sensor includes a first structure to which torque is applied, a second structure from which torque is output, and a plurality of strain parts serving as beams connecting the first structure and the second structure, and a plurality of strain gauges serving as sensor elements are arranged on the strain parts. A bridge circuit is constituted by these strain gauges (cf., for example, Patent Literature 1 (JP 2013-096735 A), Patent Literature 2 (JP 2015-049209 A) and Patent Literature 3 (JP 2017-172983 A)).

In a torque amount converter which measures a torque generated in an output unit of an engine, etc., of an automobile, a technique for reducing an influence of a bending stress other than torque has been developed (cf., for example, Patent Literature 4 (JP 2010-169586 A)).

SUMMARY

For example, a disk-shaped torque sensor comprises a first structure, a second structure, and a third structure between the first structure and the second structure, and is equipped with a strain body serving as a strain sensor, and a strain gauge, between the first structure and the second structure.

When the first structure is fixed to, for example, a base of a robot arm and the second structure is fixedly used on, for example, an arm of the robot arm, a bending moment accompanying a transfer weight of the robot arm, a distance to the load and acting acceleration, and a load of its reaction force are applied to the torque sensor, other than the torque.

When a torque sensor is attached to a robot arm, a center of axis of the torque sensor needs to be aligned with a center of axis of, for example, an arm or a base of the robot arm.

When a shape of a first structure of the torque sensor is assumed to be, for example, a column and a shape of the base of the robot arm is assumed to be a cylinder, the centers of axes are made to coincide with each other by fitting the column into the cylinder. In this case, however, the axes are coincident with each other, but it is unclear which parts of the column and the cylinder are exactly in contact with each other. That is, the column and the cylinder are not perfect circles, and each of the outer diameter of the column and the inner diameter of the cylinder is irregular. For this reason, the outer surface of the column and the inner surface of the cylinder are expected to be in contact with each other at several points at random.

Thus, in a case where the first structure of the torque sensor, and the base and the arm of the robot arm are brought into contact with each other at several points at random, when the bending moment other than torque, and the translational force are applied to the torque sensor, the first structure and the second structure are asymmetrically deformed, and the strain sensor is deformed asymmetrically due to its deformation, and an output is emitted from the sensor.

When a bending moment and a load (X-axis direction Fx, Y-axis direction Fy, and Z-axis direction Fz), i.e., a translational force other than the torque is applied to the torque sensor, distortion corresponding to displacement occurs in the plurality of strain sensors provided in the torque sensor. In general, a bridge circuit of a torque sensor is configured to output a voltage against a force in a torque direction and not to output a voltage against a force in a direction other than the torque. However, if the first structure or the second structure is deformed asymmetrically, an asymmetric strain is generated at a plurality of strain sensors provided in the torque sensor. Besides this, a sensor output is generated and the detection accuracy of the torque sensor is degraded due to the axial interference.

Embodiments described herein aim to provide a mounting structure for a torque sensor capable of improving a detection accuracy of a torque sensor.

According to the embodiment, there is provided a mounting structure for a torque sensor comprising: a torque sensor comprising a first structure, a second structure, a third structure provided between the first structure and the second structure, and at least two senor units provided between the first structure and the second structure; and a plurality of contact portions provided on one of the first structure and a first attachment portion and one of the second structure and a second attachment portion, and being in contact with another of the first structure and the first attachment portion and another of the second structure and the second attachment portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Embodiments will be described hereinafter with reference to the accompanying drawings. In the drawings, the same elements are denoted by the same reference numerals.

First, a robot arm 30 and a torque sensor 40 to which the embodiments are applied will be described with reference to FIG. 1 and FIG. 2.

Figure 1:
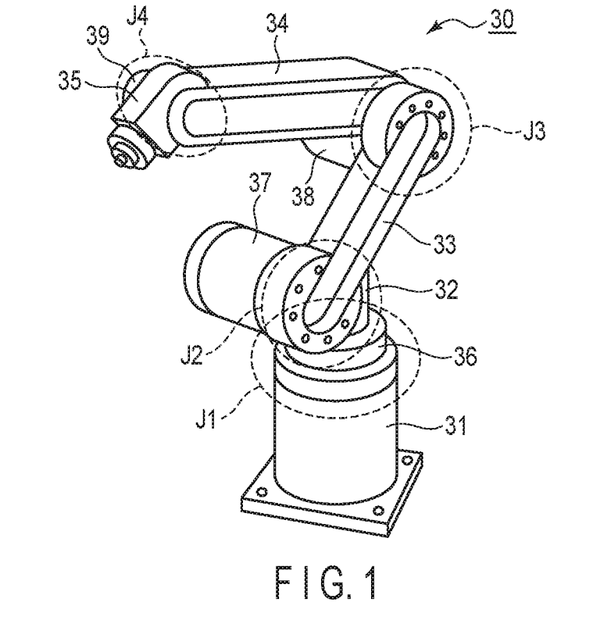
FIG. 1 is a perspective view showing an example of a robot arm to which a first embodiment is applied.

FIG. 1 shows an example of an articulated robot, i.e., the robot arm 30. The robot arm 30 comprises, for example, a base 31, a first arm 32, a second arm 33, a third arm 34, a fourth arm 35, a first drive unit 36 serving as a drive source, a second drive unit 37, a third drive unit 38, and a fourth drive unit 39. However, the structure of the robot arm 30 is not limited thereto, but can be modified.

The first arm 32 is provided to be rotatable relative to the base 31 by the first drive unit 36 provided in a first joint J1. The second arm 33 is provided to be rotatable relative to the first arm 32 by the second drive unit 37 provided in a second joint J2. The third arm 34 is provided to be rotatable relative to the second arm 33 by the third drive unit 38 provided in a third joint J3. The fourth arm 35 is provided to be rotatable relative to the third arm 34 by the fourth drive unit 39 provided in a fourth joint J4. A hand and various tools (not shown) are mounted on the fourth arm 35.

Each of the first drive unit 36 to the fourth drive unit 39 comprises, for example, a motor, a speed reducer, and a torque sensor, which will be described later.

Figure 2:
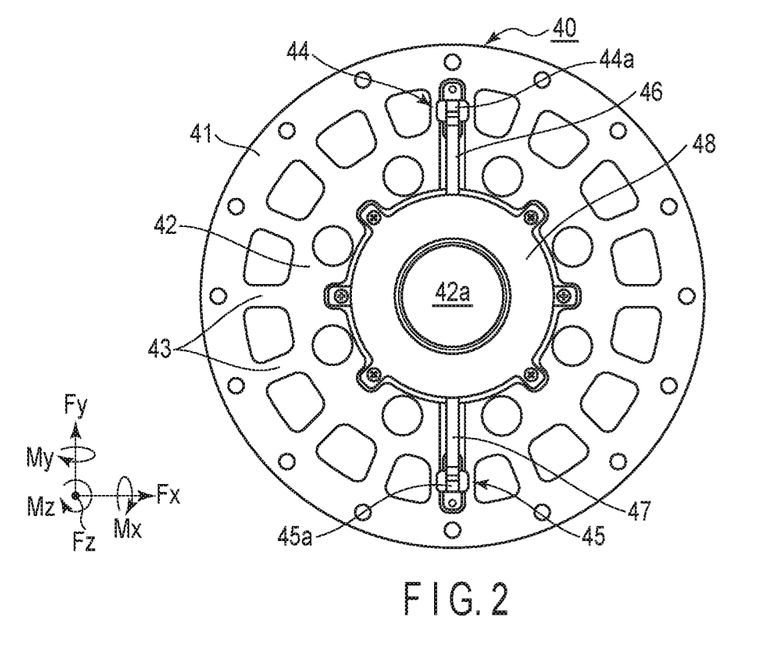
FIG. 2 is a plan view showing an example of a torque sensor applied to the first embodiment.

FIG. 2 shows an example of a disk-shaped torque sensor 40 applied to the present embodiment. The torque sensor 40 comprises a first structure 41, a second structure 42, a plurality of third structures 43, a first strain sensor 44 and a second strain sensor 45 serving as sensor units, and the like.

The first structure 41 and the second structure 42 are formed in an annular shape, and a diameter of the second structure 42 is smaller than a diameter of the first structure 41. The second structure 42 is arranged concentrically with the first structure 41, and the first structure 41 and the second structure 42 are connected by the third structures 43 serving as a plurality of beams arranged radially. The plurality of third structures 43 transmit torque between the first structure 41 and the second structure 42. The second structure 42 has a hollow portion 42a and, for example, a line (not shown) is passed through the hollow portion 42a.

The first structure 41, the second structure 42, and the plurality of 3 structures 43 are formed of a metal, for example, stainless steel. However, a material other than metal can be used if a mechanically sufficient strength can be obtained for the applied torque. The first structure 41, the second structure 42, and the plurality of 3 structures 43 have, for example, the same thickness. The mechanical strength of the torque sensor 40 is set based on the thickness, width, and length of the third structures 43.

The first strain sensor 44 and the second strain sensor 45 are provided between the first structure 41 and the second structure 42. More specifically, one end of the strain body 44a constituting the first strain sensor 44 and one end of the strain body 45a constituting the second strain sensor 45 are joined to the first structure 41, and the other ends of the strain bodies 44a and 45a are joined to the second structure 42. The thickness of the strain bodies 44a and 45a is smaller than the thickness of the first structure 41, the second structure 42, and the plurality of third structures 43.

A plurality of strain gauges (not shown) serving as sensor elements are provided on each of the surfaces of the strain bodies 44a and 45a. A first bridge circuit is composed of the sensor elements provided on the strain body 44a, and a second bridge circuit is composed of the sensor elements provided on the strain body 45a. That is, the torque sensor 40 comprises two bridge circuits.

In addition, the first strain sensor 44 and the second strain sensor 45 are arranged at symmetrical positions with respect to the center of the first structure 41 and the second structure 42 (the center of action of the torque). In other words, the first strain sensor 44 and the second strain sensor 45 are arranged on the diameter of the annular first structure 41 and second structure 42.

The first strain sensor 44 (strain body 44a) is connected to a flexible substrate 46, and the second strain sensor 45 (strain body 45a) is connected to a flexible substrate 47. The flexible substrates 46 and 47 are connected to a printed circuit board (not shown) covered with a cover 48. An operational amplifier for amplifying output voltages of two bridge circuits is arranged on the printed circuit board. Since the circuit configuration is not essential to the embodiment, descriptions thereof will be omitted.

First Embodiment

Figure 3:
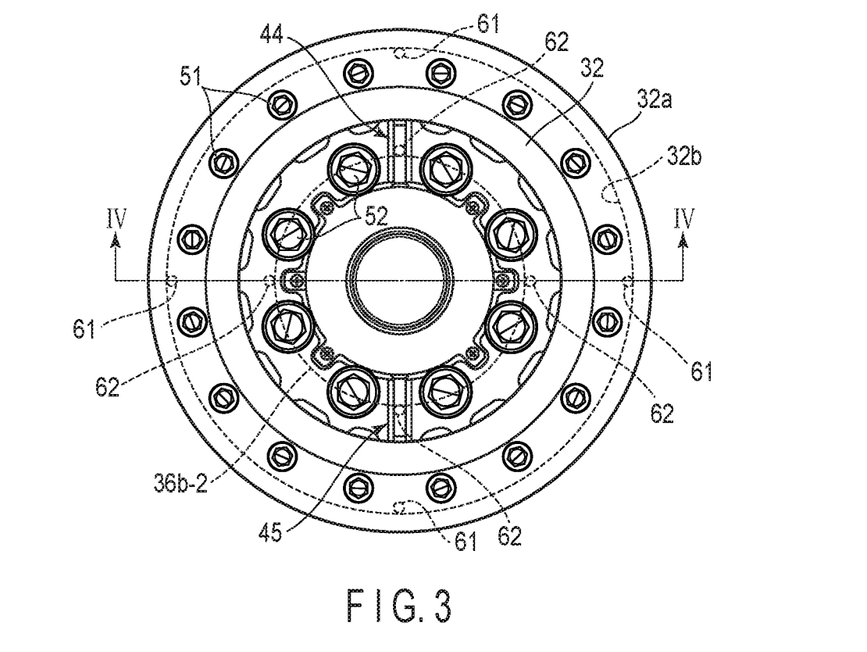
FIG. 3 is a plan view showing an example of a mounting structure for a torque sensor according to the first embodiment.
Figure 4:
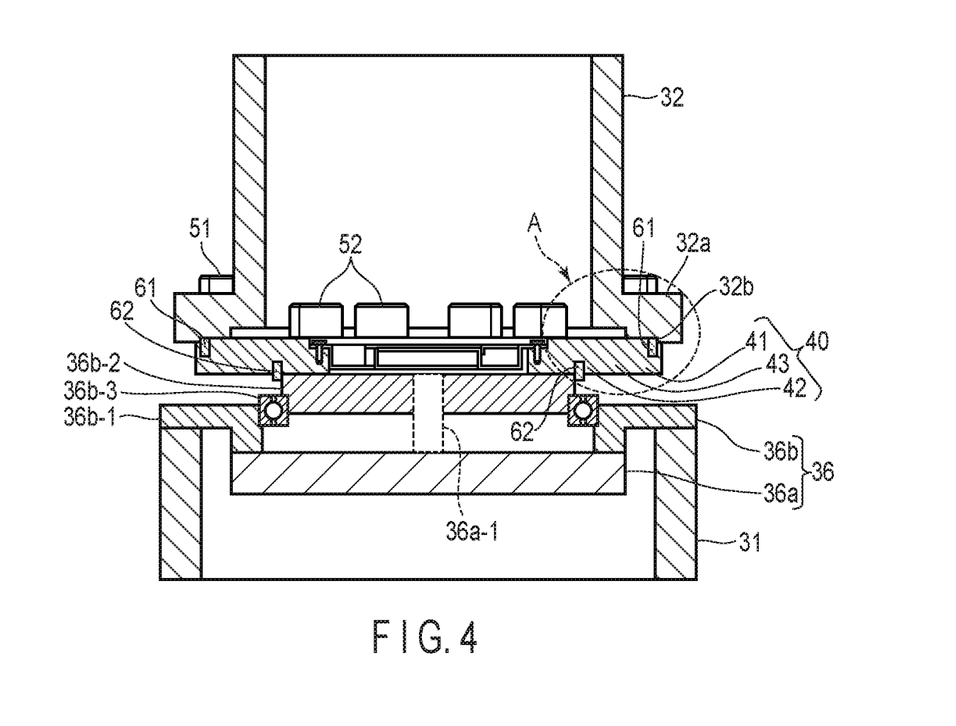
FIG. 4 is a cross-sectional view taken along line IV-IV of FIG. 3.

FIG. 3 and FIG. 4 show a first embodiment. The torque sensor 40 is provided in, for example, the first drive unit 36 of the robot arm 30. However, the torque sensor 40 can also be provided in, for example, the second drive unit 37 to the fourth drive unit 39 of the robot arm 30.

In FIG. 3 and FIG. 4, the first structure 41 of the torque sensor 40 is fixed to the first arm 32 by a plurality of bolts 51. That is, a plurality of bolts 51 are inserted into the flange 32a of the first arm 32, and the bolts 51 are screwed onto the surface of the first structure 41. For this reason, a part of the back surface of the flange 32a of the first arm 32 is fixed to the surface of the first structure 41.

The first drive unit 36 includes, for example, a motor 36a and a speed reducer 36b. The speed reducer 36b comprises, for example, a casing 36b-1, an output shaft 36b-2, a bearing 36b-3, and a plurality of gears (not shown). The output shaft 36b-2 is connected to a shaft 36a-1 of the motor 36a via a plurality of gears (not shown) and is provided to be rotatable with respect to the casing 36b-1 by the bearing 36b-3. The motor 36a is provided in the casing 36b-1 of the speed reducer 36b, and the casing 36b-1 is fixed to, for example, the base 31.

The second structure 42 of the torque sensor 40 is connected to the output shaft 36b-2 of the speed reducer 36b by a plurality of bolts 52. That is, the back surface of the second structure 42 is fixed to the surface of the output shaft 36b-2.

Figure 5:
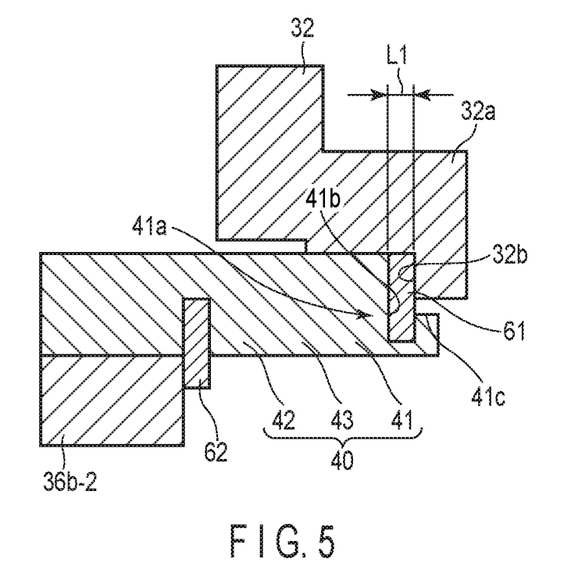
FIG. 5 is a cross-sectional view showing a portion represented by arrow A of FIG. 4.

In contrast, as shown in FIG. 4 and FIG. 5, for example, a vertical inner side surface (hereinafter simply referred to as a side surface) 32b is provided on a back surface, around the back surface of the flange 32a. The side surface 32b and the back surface form, for example, a step part. The side surface 32b is a surface that is parallel to an outer peripheral surface of the torque sensor 40, i.e., an outer peripheral surface of the first structure 41, and is separated from an outer peripheral surface of the first structure 41 by a predetermined distance L1.

More specifically, as shown in FIG. 5, a step part 41a is provided at an outer peripheral part of the first structure 41, and a side surface 41b of the step part 41a is spaced apart from the side surface 32b of the flange 32a by the distance L1. The side surface 41b of the step part 41a is also hereinafter referred to as the side surface 41b of the first structure 41.

As shown in FIG. 3 to FIG. 5, a plurality of pins 61 serving as first contact portions are provided on an outer peripheral portion of the first structure 41. The number of pins 61 is even, for example, four. The number of pins 61 is larger than the number of the strain bodies 44a and 45a or equal to the number of the strain bodies 44a and 45a.

Four pins 61 are arranged at equal intervals on the outer periphery of the first structure 41. More specifically, the pins 61 are provided on a straight line connecting the first strain sensor 44 and the second strain sensor 45 and on a straight line orthogonal to this straight line. However, the number and arrangement of pins 61 are not limited thereto. For example, the first strain sensor 44 and the second strain sensor 45 may be arranged at positions displaced by 45 degrees relative to four pins 61 shifted by 90 degrees.

Alternatively, for example, when four strain sensors are used, the four strain sensors may be arranged at the same angle as the four pins 61 or may be arranged at positions shifted from the four pins 61 by 45 degrees.

The pin 61 is formed of, for example, a cylindrical metal and, as shown in FIG. 5, one end of the pin 61 is inserted into the bottom part 41c of the step part 41a. More specifically, the pin 61 is press-fitted in an axial direction orthogonal to the surface of the torque sensor 40, and the side surface of the pin 61 is in contact with the side surface 41b of the step part 41a. The pin 61 is not limited to metal, and can be formed of resin.

The diameter of the pin 61 is set to be equal to the distance L1 between the side surface 32b of the flange 32a and the side surface 41b of the step part 41a. For this reason, the side surfaces of four pins 61 are in line contact with the side surface 32b of the flange 32a, and the side surfaces of four pins 61 are in line contact with the side surface of the first structure 41 of the torque sensor 40. In other words, the side surface 41b of the first structure 41 of the torque sensor 40 is not in contact with the flange 32a of the first arm 32 except for the portions of four pins 61.

In addition, a plurality of pins 62 are provided as second contact portions, on the back surface of the second structure 42 of the torque sensor 40. The number of pins 62 is even, for example, four, similarly to the pins 61. As shown in FIG. 3, four pins 62 are arranged at regular intervals on the second structure 42. The arrangement of the pins 62 is similar to that of the pins 61. More specifically, the pins 62 are provided on a straight line connecting the first strain sensor 44 and the second strain sensor 45 and on a straight line orthogonal to the straight line. However, the number and arrangement of the pins 62 are not limited thereto.

Similarly to the pin 61, the pin 62 is formed of, for example, a cylindrical metal and, as shown in FIG. 5, one end of the pin 62 is inserted (press-fitted) into the back surface of the second structure 42. The pin 62 can also be formed of a resin material, similarly the pin 61.

The diameter of the pin 62 is equal to that of the pin 61, and the side surface of the pin 62 is in line contact with the side surface of the output shaft 36b-2 of the speed reducer 36b. For this reason, the side surface of the output shaft 36b-2 is connected to the second structure 42 of the torque sensor 40 via four pins 62. In other words, the second structure 42 of the torque sensor 40 is not in contact with the side surface of the output shaft 36b-2, except for the parts of four pins 62.

In the above-described structure, when the speed reducer 36b is driven by the motor 36a, a force in the torque (Mz) direction is applied to the torque sensor 40. The first structure 41 of the torque sensor 40 is displaced in the torque (Mz) direction relative to the second structure 42. In the torque sensor 40, when the first structure 41 is displaced relative to the second structure 42, an electric signal is output from the first strain sensor 44 and the second strain sensor 45, and the torque can be detected.

In contrast, the side surface of the first structure 41 of the torque sensor 40 is in contact with the flange 32a of the first arm 32 at the parts of the four pins 61 and is not in contact with the flange 32a of the first arm 32 at parts other than the pins 61. Furthermore, the second structure 42 of the torque sensor 40 is in contact with the side surface of the output shaft 36b-2 at the parts of the four pins 62 and is not in contact with the side surface of the output shaft 36b-2 at parts other than the pins 62. Therefore, when a bending moment or a translational force in directions (Mx, My) other than the torque is generated on the first arm 32 by the operations of the first arm 32 to the fourth arm 35, the bending moment or the translational force acts on the torque sensor 40 via the pins 61 and the pins 62. However, the first structure 41 is in contact with the flange 32a of the first arm 32 by four pins 61, and the second structure 42 is in contact with the output shaft 36b-2 by four pins 62. For this reason, the first structure 41 can be deformed with good balance with respect to the second structure 42, and the strain body 44a constituting the first strain sensor 44 and the strain body 45a forming the second strain sensor 45 can be deformed symmetrically. Therefore, in the first strain sensor 44 and the second strain sensor 45, the output of the signals to the bending moment and the translational force in the direction (Mx, My) other than the torque is suppressed.

Advantages of First Embodiment

According to the first embodiment, the first structure 41 of the torque sensor 40 is in line contact with, for example, the side surface 32b of the first arm 32 serving as the first attachment portion via four pins 61 serving as the first contact portions, and the second structure 42 is in line contact with the side surface of the output shaft 36b-2 of the speed reducer 36b provided on the base 31 serving as the second attachment portion via four pins 62 serving as the second contact portions. For this reason, when the bending moment and the translational force are generated in the directions (Mx, My) other than the torque on the first arm 32, the first structure 41 of the torque sensor 40 is deformed with good balance with respect to the second structure 42, and the strain body 44a of the first strain sensor 44 and the strain body 45a of the second strain sensor 45 are deformed symmetrically. For this reason, output of the signals to the bending moment and the translational force in the directions (Mx, My) other than the torque can be suppressed. Therefore, the interference of the other axis can be reduced and the detection accuracy of the torque can be improved.

For example, when a configuration without a plurality of pins 61 is assumed, the side surface of the first structure 41 of the torque sensor 40 and the side surface of the first arm 32 are not shaped in a perfect circle, but are slightly deformed as viewed microscopically. For this reason, the side surface of the first structure 41 and the side surface of the first arm 32 are in contact with each other at a plurality of parts. If the side surface of the first structure 41 and the side surface of the first arm 32 are fully and uniformly in contact with each other, the strain body 44a constituting the first strain sensor 44 and the strain body 45a constituting the second strain sensor 45 generate strain symmetrical to the bending moment and the translational force other than the torque applied to the torque sensor 40. However, when the side surface of the first structure 41 and the side surface of the first arm 32 are not on, for example, a straight line connecting the first strain sensor 44 and the second strain sensor 45 or a straight line perpendicular to this straight line, but are in contact at three points of non-regular intervals, the deformation of the strain body 44a and the strain body 45a becomes asymmetrical and a signal is generated.

However, when the side surface of the first structure 41 and the side surface of the first arm 32 are in contact with each other via four pins 61, and when the strain body 44a and the strain body 45a are arranged to correspond to two pins 61 arranged on a diameter, similarly to the first embodiment, the strain body 44a and the strain body 45a generate strain symmetrical to the bending moment and the translational force other than the torque applied to the torque sensor 40. For this reason, the torque sensor 40 can suppress the generation of signals for the bending moment and translational force other than the torque. Therefore, the detection accuracy of the torque can be improved.

Second Embodiment

Figure 6:
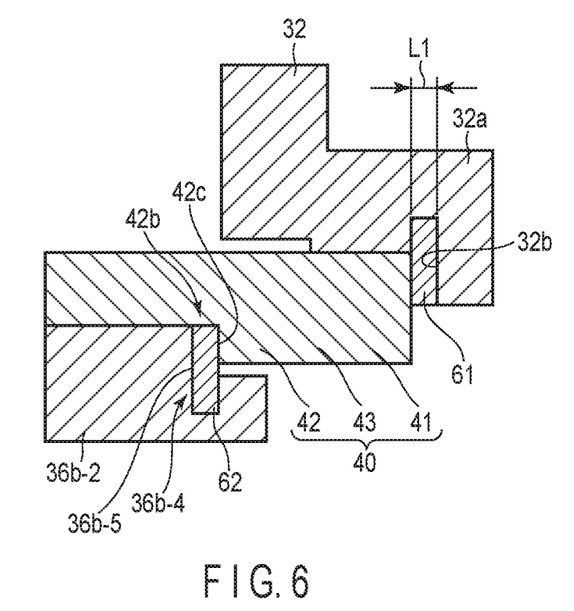
FIG. 6 is a cross-sectional view showing an example of a mounting structure for a torque sensor according to a second embodiment.

FIG. 6 shows a second embodiment.

In the above-described first embodiment, a plurality of pins 61 are provided in the first structure 41 of the torque sensor 40, and a plurality of pins 62 are provided in the second structure 42 of the torque sensor 40. However, the present invention is not limited thereto.

In the second embodiment, one ends of the plurality of pins 61 are inserted (press-fitted) into the flange 32a of the first arm 32, and one ends of the plurality of pins 62 are inserted (press-fitted) into, for example, the output shaft 36b-2 of the speed reducer 36b.

The side surfaces of the pins 61 are in contact with the side surface of the first structure 41 of the torque sensor 40 and the side surface 32b of the flange 32a. The side surface of the pin 62 is in contact with the side surface 42c of the step part 42b provided on the second structure 42 of the torque sensor 40, and the side surface 36b-5 constituting the step part 36b-4 of the output shaft 36b-2.

Advantages of Second Embodiment

According to the second embodiment, the first structure 41 of the torque sensor 40 is in contact with, for example, the side surface 32b of the first arm 32 serving as the first attachment portion via a plurality of pins 61 serving as the first contact portions, and the second structure 42 is in contact with the side surface 36b-5 of the output shaft 36b-2 of the speed reducer 36b provided on the base 31 serving as the second attachment portion via a plurality of pins 62 serving as the second contact portions. Therefore, in the second embodiment, too, the interference of the other axis can be reduced and the detection accuracy of the torque can be improved, similarly to the first embodiment.

Third Embodiment

Figure 7:
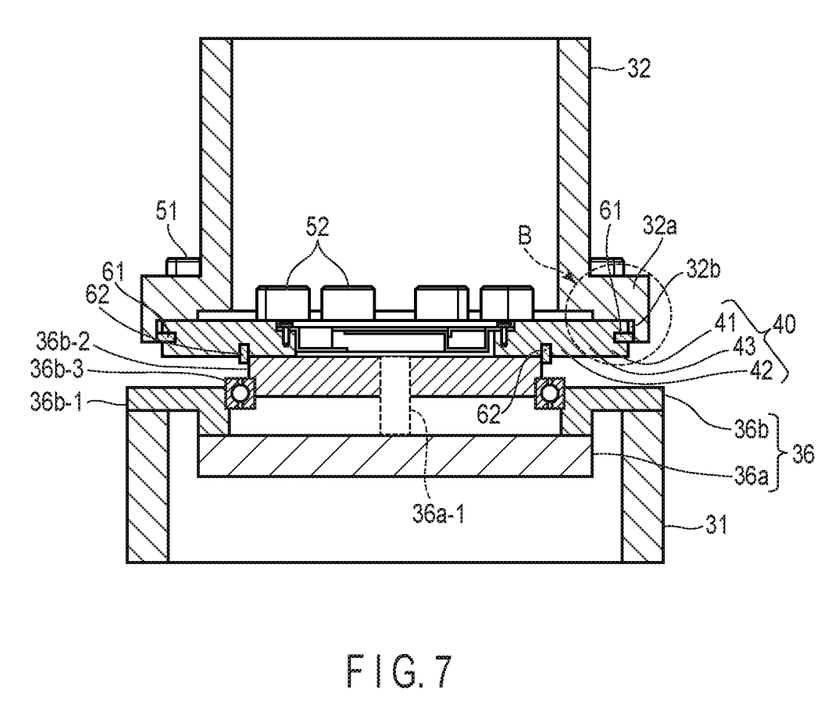
FIG. 7 is a cross-sectional view showing an example of a mounting structure for a torque sensor according to a third embodiment.
Figure 8:
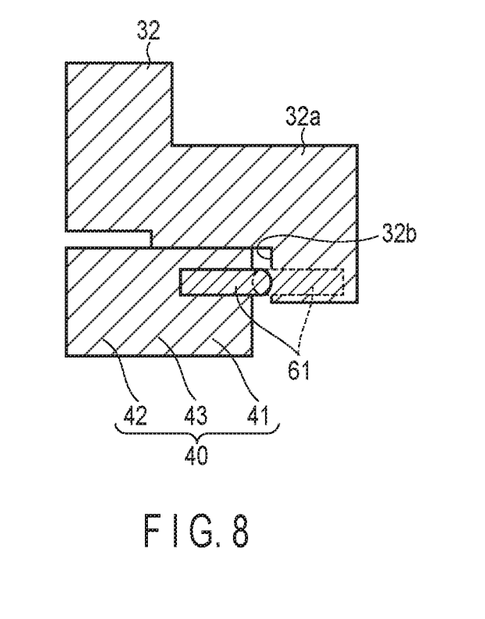
FIG. 8 is a cross-sectional view showing a portion represented by arrow B of FIG. 7.

FIG. 7 and FIG. 8 show a third embodiment.

In the first and second embodiments, the plurality of pins 61 are provided in the direction orthogonal to the surface of the torque sensor 40. However, the present invention is not limited thereto.

As shown in FIG. 7 and FIG. 8, in the third embodiment, a plurality of pins 61 are press-fitted into the side surface of the first structure 41 of the torque sensor 40. In other words, one ends of the pins 61 are press-fitted into the side surface of the first structure 41 along the diameter direction of the torque sensor 40.

The other ends of the pins 61 are processed into a spherical shape and are in point contact with the side surface 32b of the flange 32a of the first arm 32.

A plurality of pins 61 are provided on the side surface of the first structure 41 of the torque sensor 40, but the present invention is not limited thereto.

As represented by a broken line in FIG. 8, for example, one ends of the plurality of pins 61 may be press-fitted into the side surface 32 b of the flange 32a, and the other ends in the spherical shape may be brought into point contact with the side surface of the first structure 41 of the torque sensor 40.

Advantages of Third Embodiment

According to the third embodiment, a plurality of pins 61 are provided on the side surface of the first structure 41 of the torque sensor 40, and the other ends of the spherical shape of the pins 61 are in point contact with the side surface 32b of the flange 32a. For this reason, since the contact area between the pin 61 and the side surface 32b of the flange 32a is small, as compared with the first and second embodiments, the output of the signal for the bending moment and the translational force in the directions (Mx, My) other than the torque can be suppressed. Therefore, the interference of the other axis can be reduced and the detection accuracy of the torque can be improved.

Modified Example

Figure 9:
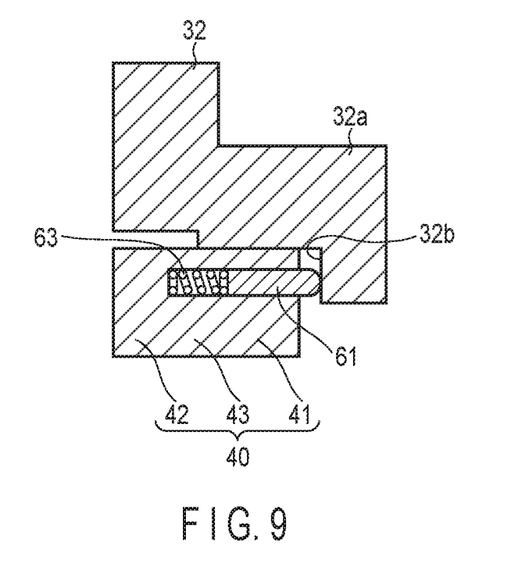
FIG. 9 is a cross-sectional view showing a modified example of the third embodiment.

FIG. 9 shows a modified example of FIG. 8. Each of the plurality of pins 61 is allowed to come into and out of the first structure 41 of the torque sensor 40, and is urged in a direction of protruding from the side surface of the first structure 41 by a coil spring 63 serving as an elastic member provided in the first structure 41.

The structure shown in FIG. 9 can also be applied to the pin 61 represented by the broken line in FIG. 8.

According to the modified example, the pin 61 is allowed to come into and out of the side surface of the first structure 41, and is urged by the coil spring 63 in the direction of protruding from the side surface of the first structure 41. For this reason, when the bending moment or the translational force in the directions (Mx, My) other than the torque is generated in the first arm 32, transmission of the bending moment and the translational force to the torque sensor 40 can be relieved by the pin 61. Therefore, output of the signals to the bending moment and the translational force in the direction (Mx, My) other than the torque can be further suppressed.

Fourth Embodiment

Figure 10:
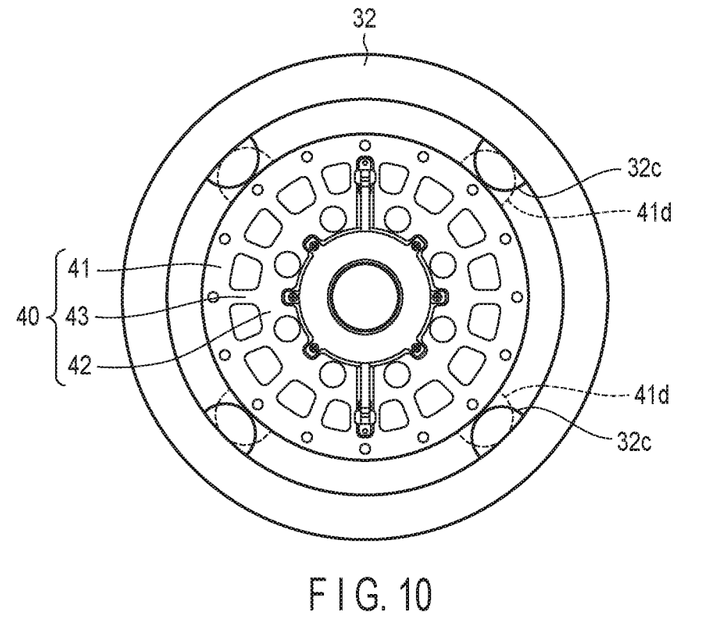
FIG. 10 is a plan view showing an example of a mounting structure for a torque sensor according to a fourth embodiment.

FIG. 10 shows a fourth embodiment.

In the fourth embodiment, for example, a plurality of protrusions 32c are integrally provided on an inner side surface of the first arm 32. Distal ends of the protrusions 32c are formed in a spherical shape. The distal ends of the protrusions 32c are made to be in point contact with the outer peripheral surface of the first structure 41 of the torque sensor 40.

The number of the plurality of protrusions 32c is an even number, for example, four. Four protrusions 32c are arranged at regular intervals. More specifically, the protrusions are arranged on two straight lines inclined at, for example, 45 degrees to the line connecting the first strain sensor 44 and the second strain sensor 45. However, the embodiment is not limited thereto. The protrusions may be arranged on a straight line connecting the first strain sensor 44 and the second strain sensor 45 and on a straight line orthogonal to this straight line.

The plurality of protrusions 32c are provided on the inner side surface of the first arm 32. However, the embodiment is not limited thereto. As represented by a broken line in FIG. 10, for example, a plurality of protrusions 41d may be provided on the outer peripheral surface of the first structure 41 of the torque sensor 40, and distal ends of these protrusions 41d may be brought into point contact with the inner side surface of the first arm 32.

In addition, the protrusions 32c and 41d may be formed in a semi-cylindrical shape, and the side surfaces of the semi-cylindrical protrusions 32c and 41d may be brought into line contact with the outer peripheral surface of the first structure 41 or the inner side surface of the first arm 32.

Advantages of Fourth Embodiment

According to the fourth embodiment, the plurality of protrusions 32c are provided on the inner side surface of the first arm 32, the protrusions 32c are brought into contact with the outer peripheral surface of the first structure 41 of the torque sensor 40 or the plurality of protrusions 41d are provided on the outer peripheral surface of the first structure 41, and the protrusions 41d are brought into contact with the inner side surface of the first arm 32. Therefore, the interference of the other axis can be reduced and the detection accuracy of the torque can be improved, similarly to the first to third embodiments.

Moreover, the plurality of protrusions 32c are formed on the inner side surface of the first arm 32, and a plurality of protrusions 41d are integrally formed on the outer peripheral surface of the first structure 41. For this reason, the number of components can be reduced and the steps of assembly can be reduced.

Modified Example

Figure 11:
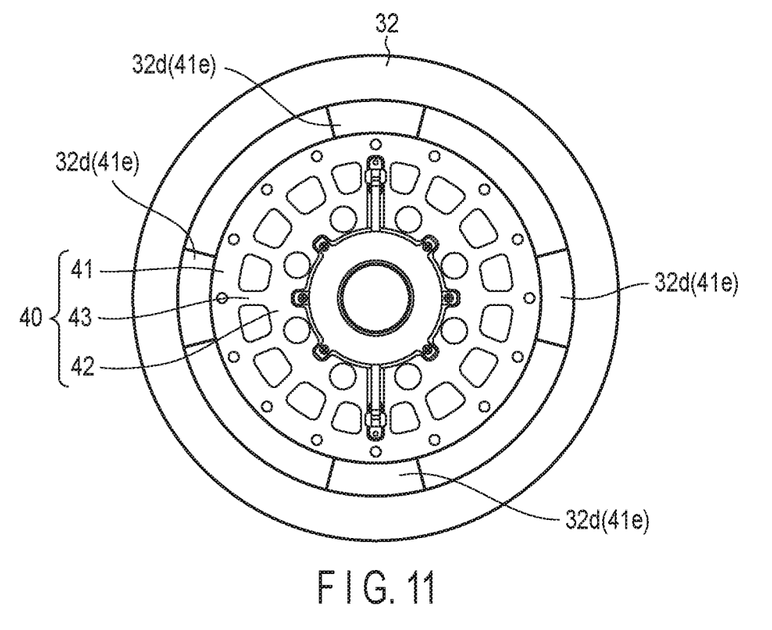
FIG. 11 is a plan view showing a modified example of the fourth embodiment.

FIG. 11 shows a modified example of FIG. 10. In FIG. 11, for example, a plurality of protrusions 32d are integrally provided on the inner side surface of the first arm 32. The protrusions 32d are formed in an arcuate shape along the outer peripheral surface of the first structure 41 of the torque sensor 40, and the side surfaces of the protrusions 32d are in surface contact with parts on the outer peripheral surface of the first structure 41 of the torque sensor 40.

The number of the plurality of protrusions 32d is an even number, for example, four. For example, four protrusions 32d are arranged on a straight line connecting the first strain sensor 44 and the second strain sensor 45 (i.e., a position corresponding to the first strain sensor 44 and the second strain sensor 45) and on a straight line orthogonal to this straight line. However, the protrusions can also be arranged at the same position as that shown in FIG. 10.

The plurality of protrusions 32d are provided on the inner side surface of the first arm 32. However, the embodiment is not limited thereto. For example, a plurality of protrusions 41e may be provided on the outer peripheral surface of the first structure 41 of the torque sensor 40, and the protrusions 41e may be brought into surface contact with the inner side surface of the first arm 32.

According to the modified example, too, the plurality of protrusions 32d in an arcuate shape provided on parts of the inner side surface of the first arm 32 are brought into surface contact with a part of the outer peripheral surface of the first structure 41 of the torque sensor 40, and the plurality of protrusions 41e in an arcuate shape provided on parts of the outer peripheral surface of the first structure 41 are brought into surface contact with a part of the inner side surface of the first arm 32. For this reason, output of the signals to the bending moment and the translational force in the directions (Mx, My) other than the torque of the torque sensor 40 can be prevented. Therefore, the interference of the other axis can be reduced and the detection accuracy of the torque can be improved.

Fifth Embodiment

Figure 12:
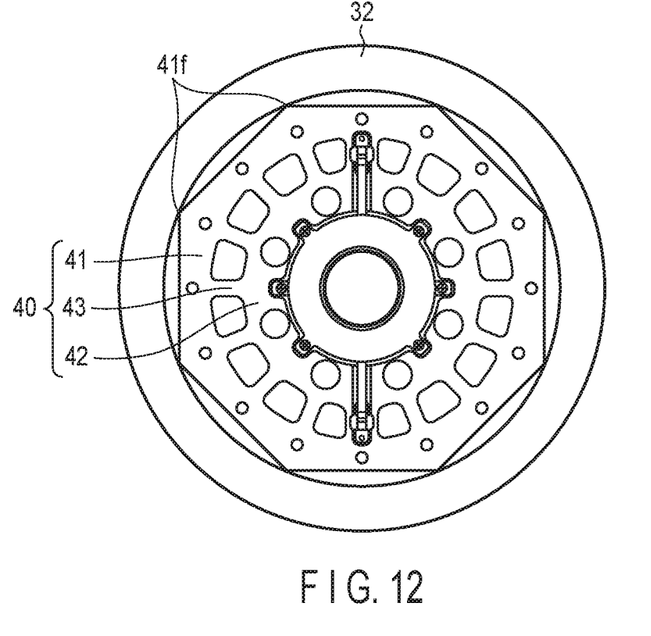
FIG. 12 is a plan view showing an example of a mounting structure for a torque sensor according to a fifth embodiment.

FIG. 12 shows a fifth embodiment.

The example of providing the plurality of protrusions on the outer peripheral surface of the first structure 41 of the torque sensor 40 has been described in the fourth embodiment.

As shown in FIG. 12, the fifth embodiment is a modification of the fourth embodiment, and the outer shape of the first structure 41 of the torque sensor 40 is, for example, a polygon having four or more corners, for example, an octagon. Vertexes 41f of the polygon are brought into, for example, line contact with, for example, the inner side surface of the first arm 32.

Modified Example

The fifth embodiment is not limited to the case where the outer shape of the first structure 41 of the torque sensor 40 is a polygon.

Figure 13:
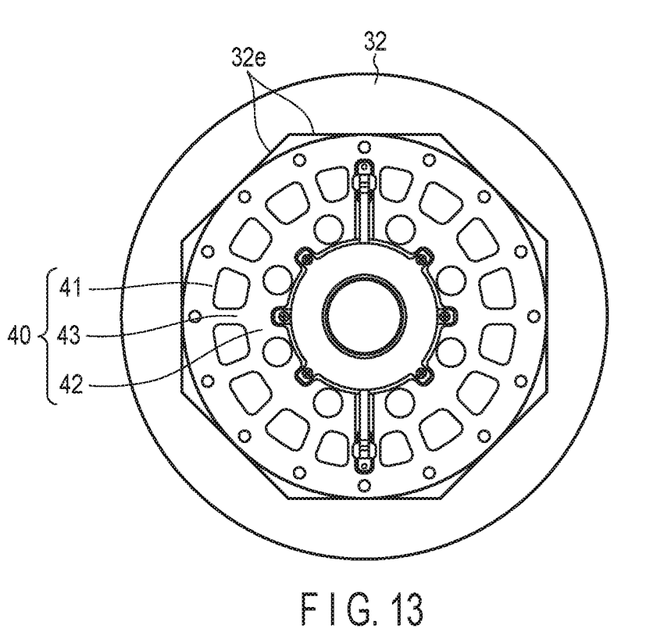
FIG. 13 is a plan view showing a modified example of the fifth embodiment.

As shown in FIG. 13, for example, the shape of the inner side surface of the first arm 32 can be formed as a polygon, and the outer peripheral surface of the first structure 41 of the torque sensor 40 having a disk-shaped outer shape can also be in, for example, line contact with each of the sides 32e of the polygon.

Advantages of Fifth Embodiment

According to the fifth embodiment, the outer shape of the first structure 41 of the torque sensor 40 is formed as a polygon, the inner side surface of the first arm 32 is brought into contact with each of the vertexes 41f of the polygon, the inner side surface of the first arm 32 is formed as a polygon, and the first structure 41 of the disk-shaped torque sensor 40 is brought into contact with each of the sides 32e of the polygon. Therefore, the interference of the other axis can be reduced and the detection accuracy of the torque can be improved, similarly to the first to fourth embodiments.

Modified Example

Figure 14:
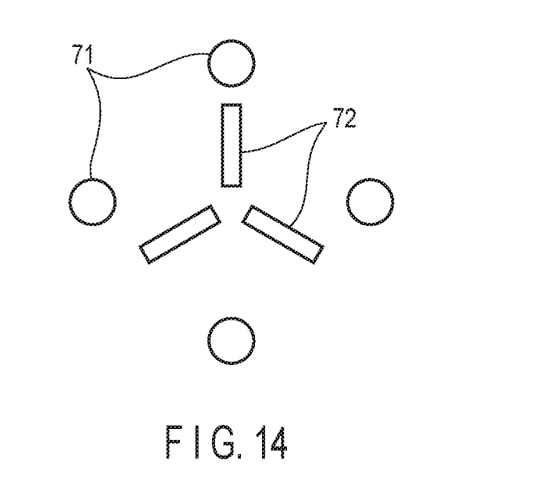
FIG. 14 is a schematic diagram showing a modified example of the fifth embodiment.
Figure 15:
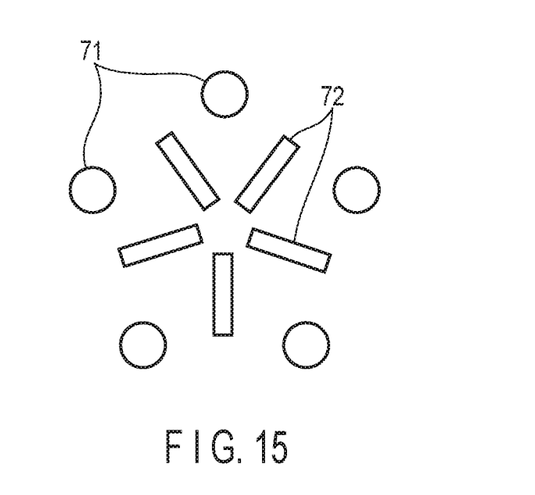
FIG. 15 is a schematic diagram showing a modified example of the fifth embodiment.

FIG. 14 and FIG. 15 show a modified example of the fifth embodiment, illustrating a plurality of contact portions 71 between the first structure 41 of the torque sensor 40 and the first arm 32, and a plurality of strain sensors 72.

The number of contact portions between the first structure 41 of the torque sensor 40 and the first arm 32 is not limited to an even number, but may be an odd number.

The number of strain sensors is not limited to an even number but may be an odd number.

FIG. 14 shows a case where the number of contact portions between the first structure 41 of the torque sensor 40 and the first arm 32 is an even number, for example, four, and the number of the strain sensors is an odd number, for example, three.

FIG. 15 shows a case where the number of contact portions between the first structure 41 of the torque sensor 40 and the first arm 32 is an odd number, for example, five, and the number of the strain sensors is an odd number, for example, five.

The plurality of strain sensors 72 are arranged at regular intervals, and a plurality of contact portions 71 are also arranged at regular intervals.

As shown in FIG. 14, one sensor portion 72 is arranged at a position corresponding to the contact portion 71. Two or more portions where the sensor portion 72 is arranged at a position corresponding to the contact portion 72 may be provided.

As shown in FIG. 14 and FIG. 15, one or more portions where the sensor portion 72 is arranged at a position corresponding to a middle part between two adjacent contact portions 71 may be provided.

Furthermore, one or more portions where the contact portion 71 is arranged at a position corresponding to the middle part of two adjacent sensor portions 72 may be provided.

The present invention is not limited to the embodiments described above, and the constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mounting structure for attaching a torque sensor to a first attachment portion and a second attachment portion, the mounting structure comprising:

a torque sensor comprising a first structure, a second structure, a plurality of third structures provided between the first structure and the second structure, and at least two sensor units provided between the first structure and the second structure; and a plurality of contact portions provided on one of the first structure and the first attachment portion and one of the second structure and the second attachment portion, and being in line contact with another of a side surface of the first structure and an inner side surface of the first attachment portion and another of an inner side surface of the second structure and a side surface of the second attachment portion.

2. The mounting structure for the torque sensor of claim 1, wherein the contact portions include a plurality of first contact portions and a plurality of second contact portions, the first contact portions are provided on one of the first structure and the first attachment portion, and the second contact portions are provided on one of the second structure and the second attachment portion.

3. The mounting structure for the torque sensor of claim 2, wherein the plurality of first contact portions are in line contact with the side surface of the first structure and the inner side surface of the first attachment portion when provided on the first structure, and are in line contact with the inner side surface of first attachment portion and the side surface of the first structure when provided on the first attachment portion.

4. The mounting structure for the torque sensor of claim 3, wherein the number of the contact portions is an even number and larger than or equal to the number of the sensor units, the number of the sensor units is an even number, and each of the sensor units is arranged at regular intervals and are arranged at positions corresponding to the contact portions.

5. The mounting structure for the torque sensor of claim 3, wherein the number of the contact portions is an even number and larger than or equal to the number of the sensor units, the number of the sensor units is an even number, and each of the sensor units is arranged at regular intervals and are arranged to correspond to middle positions between the adjacent contact portions.

6. The mounting structure for the torque sensor of claim 3, wherein the sensor units are arranged at regular intervals, and one or more of the sensor units are arranged at positions corresponding to the contact portions.

7. The mounting structure for the torque sensor of claim 3, wherein the sensor units are arranged at regular intervals, and one or more of the sensor units are arranged at positions corresponding to middle parts between two of the contact portions adjacent to each other.

8. The mounting structure for the torque sensor of claim 3, wherein the sensor units are arranged at regular intervals, and one or more of the contact portions are arranged at positions corresponding to middle parts between two of the sensor units adjacent to each other.

9. The mounting structure for the torque sensor of claim 1, wherein each of the contact portions is a pin.

10. The mounting structure for the torque sensor of claim 9, wherein
a side surface of each of the pins is brought into contact with a side surface of the first structure and an inner side surface of the first attachment portion, or an inner side surface of the second structure and a side surface of the second attachment portion.

11. The mounting structure for the torque sensor of claim 10, wherein the pin is inserted into one of the first structure and the first attachment portion.

12. The mounting structure for the torque sensor of claim 11, wherein
one of the first structure and the first attachment portion includes a step part,
one end of the pin is inserted into a bottom part of the step part, and
a side surface of another end of the pin is brought into contact with another of the first structure and the first attachment portion.

13. The mounting structure for the torque sensor of claim 9, wherein
a distal end of each of the pins is brought into contact with a side surface of one of the first structure and the first attachment portion.

14. The mounting structure for the torque sensor of claim 13, wherein the distal end of each of the pins is formed in a spherical shape.

15. The mounting structure for the torque sensor of claim 13, wherein the pin is inserted into the side surface of one of the first structure and the first attachment portion.

16. The mounting structure for the torque sensor of claim 15, further comprising:
an elastic member urging each of the pins in a direction of protruding from one of the first structure and the first attachment portion.

17. The mounting structure for the torque sensor of claim 1, wherein
the contact portions are protrusions provided on one of the first structure and the first attachment portion.

18. The mounting structure for the torque sensor of claim 17, wherein the protrusions have a spherical shape or an arcuate shape.

19. The mounting structure for the torque sensor of claim 1, wherein
the first structure of the torque sensor is shaped in a polygon and vertexes of the polygon are in contact with an inner surface of the first attachment portion in a cylindrical shape.

20. The mounting structure for the torque sensor of claim 2, wherein
the plurality of second contact portions are in line contact with an inner side surface of the second structure and the side surface of the second attachment portion when provided on the second structure, and are in line contact with the side surface of the second attachment portion and the inner side surface of the second structure when provided on the second attachment portion.

* * * * *